United States Patent [19]

Beier et al.

[11] Patent Number: 5,836,215
[45] Date of Patent: Nov. 17, 1998

[54] LAMINAR CAM ARRANGEMENT

[75] Inventors: Alfred Beier, Brunswick; Dietrich Distler, Wolfsburg; Helmut Wittke, Didderse; Christian Nesselrath, Eversen, all of Germany

[73] Assignee: Volkswagen AG, Wolfsburg, Germany

[21] Appl. No.: 272,782

[22] Filed: Jul. 8, 1994

[30] Foreign Application Priority Data

Jul. 8, 1993 [DE] Germany .......................... 43 22 776.7

[51] Int. Cl.⁶ .................................................. F16H 53/00
[52] U.S. Cl. ............................................. 74/567; 123/90.6
[58] Field of Search .................................. 74/567, 568 R, 74/569; 123/90.6, 90.17, 90.18

[56] References Cited

U.S. PATENT DOCUMENTS

| | | | |
|---|---|---|---|
| 2,817,248 | 12/1957 | Motzet et al. ............................. | 74/567 |
| 2,861,469 | 11/1958 | Kintzing ................................. | 74/567 X |
| 3,946,766 | 3/1976 | Amigues ................................. | 74/569 X |
| 4,620,356 | 11/1986 | Maus et al. . | |
| 4,630,498 | 12/1986 | Santi . | |
| 5,048,366 | 9/1991 | Spanio ................................. | 74/568 R |
| 5,053,601 | 10/1991 | Landtwing .......................... | 219/121.63 |
| 5,081,880 | 1/1992 | Swars ........................................ | 74/567 |
| 5,168,772 | 12/1992 | Adamis et al. ........................ | 74/567 X |

FOREIGN PATENT DOCUMENTS

| | | | |
|---|---|---|---|
| 0119112 | 9/1984 | European Pat. Off. ................. | 74/567 |
| 0309899 | 4/1989 | European Pat. Off. ................. | 74/567 |
| 2648934 | 5/1978 | Germany ................................. | 74/567 |
| 3234639 | 3/1984 | Germany ................................. | 74/567 |
| 3234640 | 12/1990 | Germany ................................. | 74/567 |
| 57-6153 | 1/1982 | Japan ..................................... | 74/567 |
| 57-90457 | 6/1982 | Japan ..................................... | 74/567 |
| 60-190501 | 9/1985 | Japan ..................................... | 74/567 |
| 61-129291 | 6/1986 | Japan ..................................... | 74/567 |
| 3-181561 | 8/1991 | Japan ..................................... | 74/567 |
| 3-181654 | 8/1991 | Japan ..................................... | 74/567 |
| 3-181655 | 8/1991 | Japan ..................................... | 74/567 |
| 6-193708 | 7/1994 | Japan ..................................... | 74/567 |
| 159230 | 12/1932 | Switzerland ............................ | 74/567 |
| 198228 | 6/1938 | Switzerland ............................ | 74/567 |
| 238672 | 8/1925 | United Kingdom ..................... | 74/567 |
| 0560607 | 4/1944 | United Kingdom . | |

OTHER PUBLICATIONS

French Search Report dated Jun. 16, 1995 in Application No. Fr 9407469.
Patent Abstract of Japanese Publication No. JP61129291.
Laminated, Phenolic Cams, Design Factors and Relative Advantages, G.J. Talbourdet, Research Division, United Shoe Machinery Corp. Product Engineering, Sep. 1939.

*Primary Examiner*—Vinh T. Luong
*Attorney, Agent, or Firm*—Baker & Botts, L.L.P.

[57] ABSTRACT

A laminar cam for the control of gas-exchange valves of an internal combustion engine is made of a plurality of punched-out layers of flat stock assembled in adjacent and aligned relation and joined together by a pin and by laser welds.

4 Claims, 2 Drawing Sheets

LAMINAR CAM ARRANGEMENT

BACKGROUND OF THE INVENTION

This invention relates to cam arrangements of the type used, for example, to control the intake and exhaust valves of internal combustion engines. Such cams involve elaborate manufacturing procedures since the cam profile surface requires very accurate surface machining to produce the required cam shape.

SUMMARY OF THE INVENTION

Accordingly, it is an object of the present invention to provide a valve control cam arrangement which overcomes the problems of the prior art.

Another object of the invention is to provide a valve control cam arrangement which can be made in a simple and convenient manner as compared with prior art cam arrangements.

These and other objects of the invention are attained by providing a cam made from a series of flat layers stamped from sheet stock having a cam profile which are assembled in facing relation and joined together at a location outside the cam profile surface.

Since flat sheet stock is used, the cam may be described as a laminated cam. Fabrication of such a cam is extraordinarily simple because the shaping of each of the individual layers of flat stock is effected by stamping and, unless the cam is a three-dimensional cam, all of the layers of flat stock can be formed by the same stamping machine. Because all of the layers have exactly the same shape, subsequent fine surface treatment of such a laminated cam is unnecessary. When the layers of flat stock are assembled, care need only be taken to align the peripheral surfaces accurately.

It will be understood that the connections holding the various layers together should not affect the cam profile surface. Generally, only localized connections between the individual layers are required. In the case of an angularly-movable cam, as described, for example, in German Patent No. 32 34 640, a dog strip fixed on the camshaft is received in an oil-filled angular recess in the cam. In such cases, a laminated cam offers the further advantage that, because of a very small clearance between adjacent layers in the cam, very small quantities of oil can pass between the layers from the angular recess to reach the cam profile surface and provide the desired lubrication between that surface and a valve-lifter or some other force-transmitting element which engages the surface as the cam is rotated.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 2:
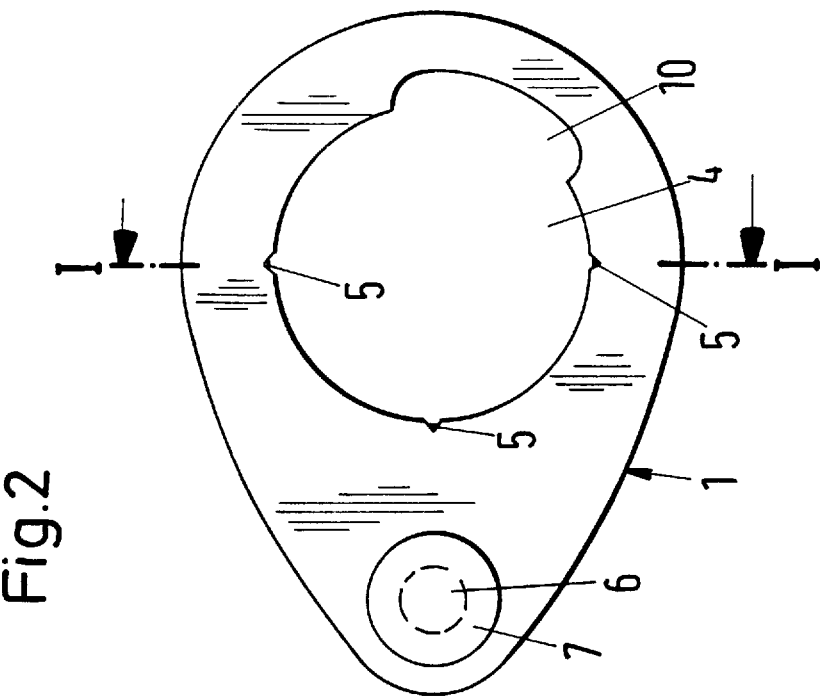
FIGS. 1 and 2 are longitudinal sectional and side views, respectively, showing a representative embodiment of a valve control cam arrangement according to the invention.
Figure 1:
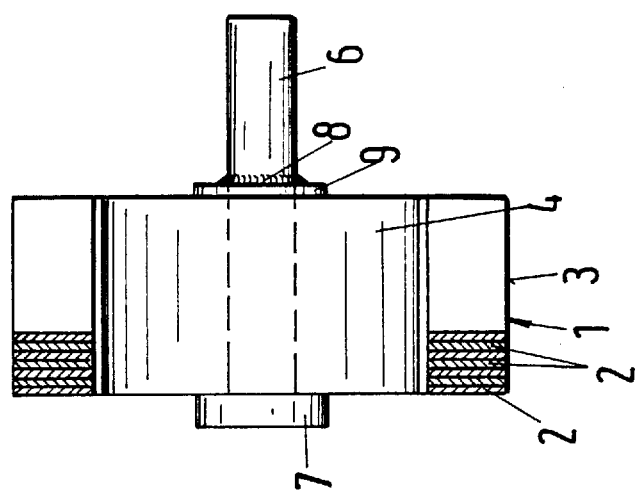

Referring first to the embodiment shown in FIGS. 1 and 2, FIG. 1 is a longitudinal section taken along the line I—I of FIG. 2 and looking in the direction of the arrows. In the illustrated embodiment, a cam 1 consists of a plurality of layers 2, which may be made, for example, of cold-rolled steel plate of the type designated "IC75". All of the layers 2 are formed in a simple manufacturing process by punching them from sheet stock so that, when assembled in aligned relation, their peripheral edges as a whole form a cam profile surface 3, and an inner opening 4 is provided to receive a camshaft (not shown). As shown in FIG. 2, three laser-weld joints 5, formed in small recesses in the opening 4, hold the layers 2 together in fixed relation, both axially and angularly. An additional axial connection between the layers is provided by a pin 6, which compresses the layers 2 together in a direction parallel to the cam axis between a cap 7 and a disk 9 which are joined to the pin 6 by laser welds 8.

The typical cam illustrated in FIGS. 1 and 2 is angularly movable on its camshaft in the manner described in the above-mentioned German Patent No. 32 34 640. For this purpose, the axial camshaft opening 4 has a radial enlargement 10 which extends over an angular region corresponding to the desired angle of motion on the camshaft and which receives a strip-like dog mounted on the camshaft. The radial enlargement 10 is filled with oil which is supplied under pressure from the camshaft so that damping of the motion of the strip-like dog in the radial enlargement is produced.

If desired, the pin 6 can be arranged to accommodate a restoring spring (not shown) of the type disclosed in German Patent No. 32 34 640 for the purpose of urging the cam toward one end of its range of angular motion on the camshaft.

Although the adjacent surfaces of the layers 2 of the cam 1 are not bonded together, it has been shown that the required tightness to oil is ensured by the described assembly. To the extent that oil does penetrate into the spaces between the layers 2, it produces a minimal enlargement of the cam in the axial direction, which assures a very tight contact between the cam and adjacent sleevelike parts. On the other hand, some escape of oil passing between the layers to the cam profile surface 3 is very desirable for the purpose of lubrication.

Figure 4:
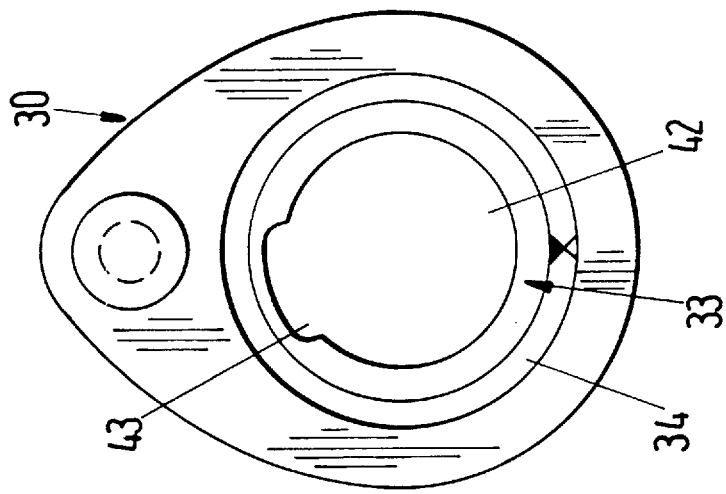
FIGS. 3 and 4 are longitudinal and side views, respectively, showing another representative embodiment of the invention.
Figure 3:
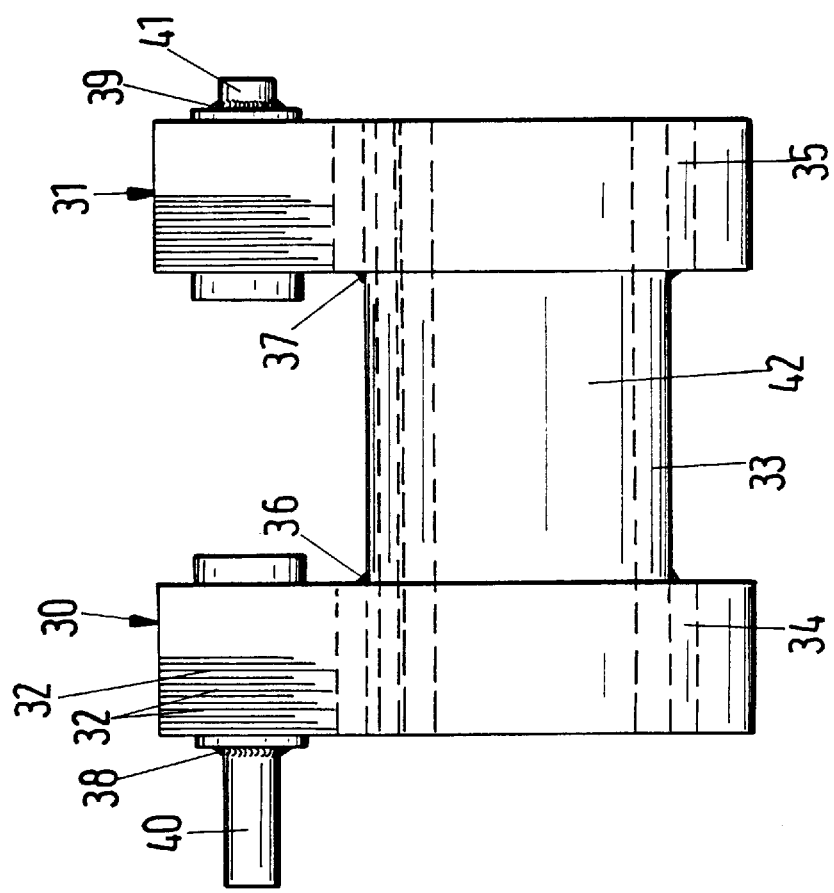

The embodiment shown in FIGS. 3 and 4 also provides an angularly-movable cam arrangement. In this case, two individual cams 30 and 31 are arranged to actuate two intake valves leading to a combustion chamber of an internal combustion engine. The two cams 30 and 31 are both composed of a plurality of layers 32 of punchable stock. In this example, a sleeve 33 extends between and through the openings in the two individual cams 30 and 31 and has plug-type teeth 34 and 35 which lock the cams to the sleeve in the angular direction. In addition, the cam layers are joined by continuous laser welds 36 and 37 and by two pins 40 and 41 connected to clamping disks by laser welds 38 and 39. As in the case of the pin 6 of FIGS. 1 and 2, the pin 40 may be arranged to accommodate a restoring spring to urge the cam assembly toward one end of its range of angular motion with respect to the camshaft.

The sleeve 33 has an axial opening 42 to receive a camshaft, and a radial enlargement 43 of the opening 42 is provided to receive a strip-like dog on the camshaft. In this case, complete sealing of the oil-filled radial enlargement 43 is assured because the sleeve 33 is made in one piece so that oil cannot seep into the very narrow spaces between the layers 32 of the cams 30 and 31.

Each of the embodiments can be made by a very simple manufacturing process, usually without requiring any fine machining of the cam profile surfaces.

Although the invention has been described herein with reference to specific embodiments, many modifications and variations therein will readily occur to those skilled in the art. Accordingly, all such variations and modifications are included within the intended scope of the invention.

We claim:

1. A cam arrangement having a cam profile surface comprising a plurality of punched layers of flat sheet stock assembled in aligned and laterally adjacent relation and providing a camshaft opening, and fastening means for joining the layers together at a location outside the cam profile surface wherein the fastening means comprises at least one weld joint adjacent to the camshaft opening.

2. A cam arrangement according to claim 1 including a pin extending through the punched layers with engaging means for engaging outer punched layers.

3. A cam arrangement according to claim 1 wherein the weld joint is formed in an axially extending recess in the cam shaft opening.

4. A cam arrangement according to claim 1 wherein the camshaft opening is formed with a radially enlarged angularly-extending recess to receive a pressure medium and accommodate a strip-like camshaft dog.

* * * * *

UNITED STATES PATENT AND TRADEMARK OFFICE
CERTIFICATE OF CORRECTION

PATENT NO. : 5,836,215

DATED : November 17, 1998:

INVENTOR(S) : Beier et al.

It is certified that error appears in the above-identified patent and that said Letters Patent is hereby corrected as shown below:

On the title page, item: [75] Inventors: "Alfred Beier, Brunswick;" should read -- Alfred Beier, Braunschweig; --;

Column 2, line 4, "IC75" should read -- C75 --.

Signed and Sealed this

Second Day of January, 2001

Attest:

Q. TODD DICKINSON

*Attesting Officer*     *Commissioner of Patents and Trademarks*